United States Patent [19]

Furrer et al.

[11] Patent Number: 4,626,692

[45] Date of Patent: Dec. 2, 1986

[54] APPARATUS FOR DETECTING IODINE ISOTOPES

[75] Inventors: Jürgen Furrer, Karlsruhe; Hans-Georg Dillman, Eggenstein, both of Fed. Rep. of Germany

[73] Assignee: Kernforschungszentrum Karlsruhe G.m.b.H, Karlsruhe, Fed. Rep. of Germany

[21] Appl. No.: 606,883

[22] Filed: May 3, 1984

[30] Foreign Application Priority Data

Jul. 7, 1983 [DE] Fed. Rep. of Germany ....... 3324523

[51] Int. Cl.$^4$ ........................................... G01N 21/01
[52] U.S. Cl. ................................ 250/432 R; 250/380; 250/304
[58] Field of Search ........... 250/370, 380, 303, 432 R, 250/434, 304, 370 L

[56] References Cited

U.S. PATENT DOCUMENTS 3,558,883  1/1971  Bench ............................. 250/370 L
3,590,247  6/1971  Holford ........................... 250/303
3,864,574  2/1975  Wilhelm et al. .................. 250/432

FOREIGN PATENT DOCUMENTS 56-22980  3/1981  Japan ................................. 250/380
56-72381  6/1981  Japan .

Primary Examiner—Alfred E. Smith
Assistant Examiner—Richard Hanig

[57] ABSTRACT

An apparatus for detecting iodine isotopes in the exhaust gas of a nuclear installation includes a duct for a partial exhaust gas stream, which duct includes an absorption chamber which is disposed in a radiation shielding structure and through which the exhaust gas flows and which has associated therewith means for admitting absorption material and for removing it therefrom. Radiation detectors are supported in the radiation shielding structure at opposite sides of the absorption chamber for monitoring radiation of iodine isotopes collected therein, the cavity in the shielding structure in which the absorption chamber is disposed being larger than the absorption chamber and the absorption chamber being supported so as to be movable in the cavity relative to said detectors to permit calibrating the apparatus.

7 Claims, 4 Drawing Figures

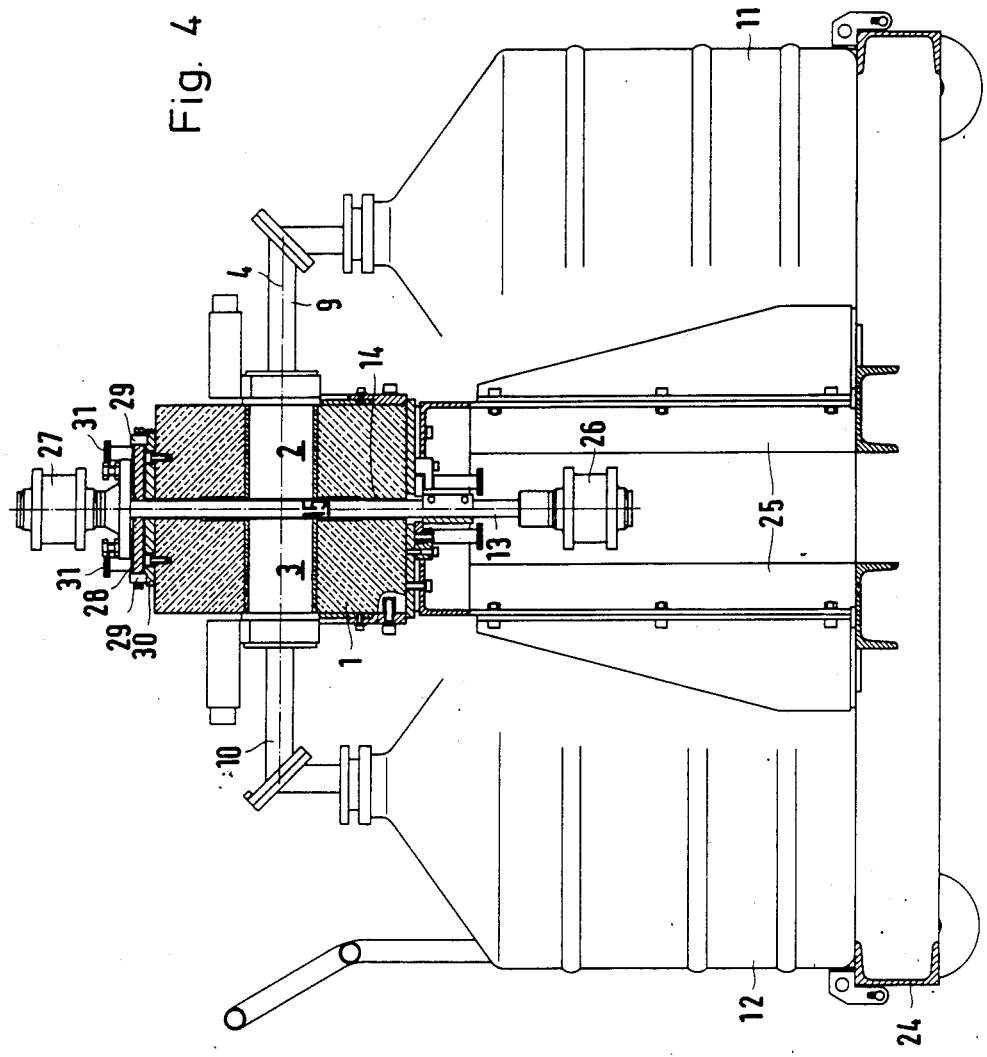

APPARATUS FOR DETECTING IODINE ISOTOPES

BACKGROUND OF THE INVENTION

The invention relates to apparatus for detecting iodine isotopes in the exhaust gas of a nuclear installation wherein a sampling flow is branched out of the main exhaust gas stream and conducted over an absorbent for measuring its iodine content.

In nuclear fuel reconstitution plants or other nuclear installations, exhaust gases must be monitored for their content of radioactive iodine isotopes, especially I-129. The activity monitoring, which may be performed on a continuous basis, is utilized to initiate measures for a reduction or elimination of the radioactivity in the exhaust gas or for an elimination of the causes for the problem, when abnormal increases in radiation occur. In this connection, it is known to take single samples manually, which samples are subsequently tested in a laboratory, as well as to provide for continuous sampling followed by laboratory analysis. The monitoring stations with continuous sampling are preferably arranged in the exhaust gas stack. The monitoring of exhaust gases from particular areas such as the dissolving plant and the first extraction cycle as well as a high activity waste storage area may be monitored separately.

These known methods are very time consuming and relatively bothersome. There is, especially, a long delay between the sampling and the sample evaluation which may result in a delay of about 8 hours for the introduction of countermeasures.

Evaluation testing needs to be performed, for example, in α-radiation shielded glove boxes.

A disadvantage of automatic sampling as it is known in the prior art resides in the fact that the degree of charge of the absorption materials with iodine isotopes cannot always be determined since an increase of the iodine content of the monitored gas appears sporadically, that is, for example, as a result of an accident. The absorption device always has to be ready for such accidents which means that the absorption material has to be exchanged after being charged to a certain degree, that is, upon reaching a certain radioactivity. It is, therefore, necessary to provide an optimal setting of detectors relative to the absorption devices which, for all practical purposes, represents a calibration or standard setting.

It is the object of the present invention to provide a monitoring arrangement of detector system, absorption device and exhaust gas flow which provides for optimal monitoring results.

SUMMARY OF THE INVENTION

In an apparatus for detecting iodine isotopes in the exhaust gas of a nuclear installation in which a partial exhaust gas stream is conducted to the apparatus through a duct which extends horizontally through a cavity in a shielding structure and an absorption chamber is disposed in the cavity for collecting radioactive iodine from the exhaust gas stream and the absorption chamber has absorption material supply means attached to its top and absorption material discharge means attached to its bottom ends for supplying the absorption chamber with fresh absorption material, radiation detectors are disposed in the shielding structure at opposite sides of the absorption chamber, the cavity in the shielding structure being larger than the absorption chamber and the absorption chamber being so supported as to be movable in the cavity relative to the detectors to permit adjustment of the detectors, sensing position relative to the absorption chamber.

A partial gas flow is continuously removed from the main exhaust gas flow in a direction normal to the main gas flow. The partial gas flow is heated to prevent condensation and conducted over an iodine filter or absorption material, for example, an Ag-impregnated filter or absorption material. Preferably, two detectors are arranged on opposite sides of the gas flow path. The absorption material may be admitted vertically to the absorption or measuring chamber manually or automatically. At the same time, cooling air is introduced for the protection of the usually temperature-sensitive detectors. By utilization of two detectors, the radiation detecting sensitivity may be improved or the energy range of the radiation to be monitored may be increased by use of a low energy and a high energy detector (for example, Si (Li) for monitoring I-129 and a detector for the γ spectroscopy). The arrangement is disposed in a chamber shielded by Pb.

For the automatic adjustment of the best possible geometric conditions, the measuring chamber may be moved relative to the fixed monitoring detectors by means of a carrier provided with a computer controlled stepping motor. It is also possible with the arrangement according to the invention to provide control signals by utilization of a multi-channel analyzer with statistic monitoring methods for the determination of confidence limits (to generate an alarm or to cause a change of absorption material, for example). With this computer it is also possible to provide for an automatic change of absorption material before the measuring capacity of the absorption structure is exhausted.

It is particularly advantageous when gravity is utilized for exchanging the absorption material. The arrangement is such that the absorption material flows vertically through the measuring chamber and into a waste barrel disposed below for disposal so that there is no radiation exposure of operating personnel. The energy range of such a monitoring system may be expanded to encompass 20 KeV to 1 MeV.

SHORT DESCRIPTION OF THE DRAWINGS

FIG. 4 shows the apparatus, partially in section.

DESCRIPTION OF A PREFERRED EMBODIMENT

Figure 1:
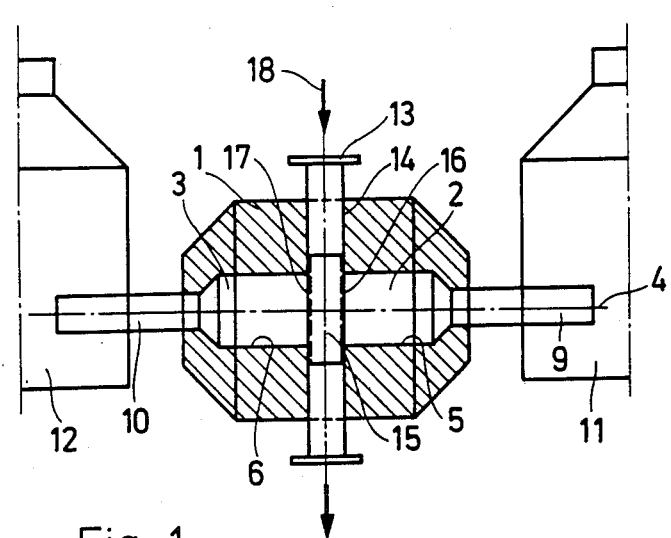
FIG. 1 is a schematic front view of the apparatus for monitoring the presence of iodine isotopes.

An apparatus for direct monitoring (on-line monitoring) of I-129 includes a radiation shielding structure 1 consisting of lead which has two cavities 5, 6 of circular cross section enclosing two intrinsic-germanium detectors 2, 3, such that their common axis 4 extends horizontally and their measuring heads 7, 8 (FIG. 2) or rather their effective receiving faces are disposed opposite, and directed toward, each other. The cavities 5 and 6 are in communication with Dewar containers 11, 12 for receiving therefrom liquified air for the cooling of the detectors 2, 3 in the cavities 5, 6. Between the detectors 2, 3 the shielding structure 1 has a slot-like cavity 14 which is oriented normal to the detector axis 4 and extends vertically with absorption material admitting and discharge ducts 13 connected to its upper and lower ends. The cavity 14 has, at least in the effective absorption chamber area (monitoring chamber), a rectangular cross section with parallel side surfaces, adjacent which the measuring heads 7, 8 are disposed directly opposite one another (possibly separated from the chamber by a radiation window). The flow axis 18 of the ducts 13 extends vertical to the detector axis 4 so that absorption material admitted from the top through ducts 13 into the measuring chamber flows downwardly, by gravity forces, out of the measuring chamber if the setting of a valve disposed in the duct 13 (not shown) permits this. Exchange of the absorption material, however, may be alternatively effected by exchange of a cartridge containing the absorption or filter materials.

Figure 2:
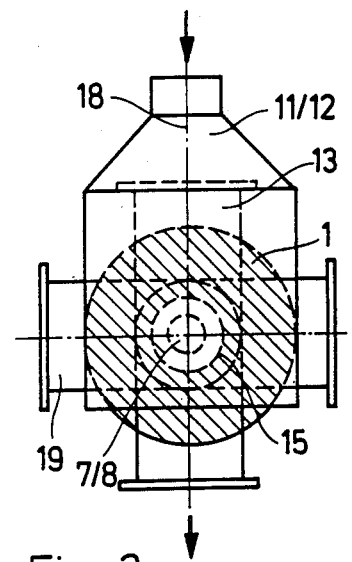
FIG. 2 is a side view of the apparatus of FIG. 1.
Figure 3:
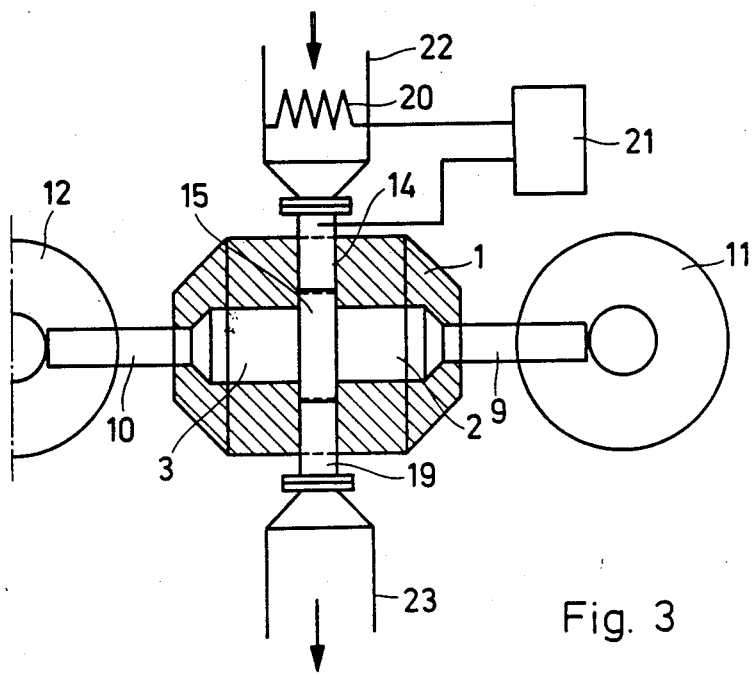
FIG. 3 is a top view of the apparatus of FIG. 1.

FIGS. 2 and 3 show the location of the detectors 2, 3 or the faces 7, 8 relative to the absorption material duct 13 and relative to the exhaust gas duct 19. The exhaust gas duct sections 19 are also rectangular in cross section and are welded to the narrow sides of the absorption chamber walls in horizontal alignment with the absorption chamber 15. The duct 19 extends normal to the detector axis 4 and normal to the absorption material duct axis 18 and is disposed in a horizontal plane which also includes the detector axis 4.

The location of the exhaust gas duct 19 in relation to the detectors 2, 3 is shown again in FIG. 3. FIG. 3 also indicates the rectangular cross section of the absorption chamber 15. With respect to the exhaust gas flow direction in front of the absorption chamber 15, the exhaust gas duct 19 includes a heater 20 operated by a temperature controller 21 for heating the exhaust gas so as to prevent cooling thereof below the condensation point of vapors contained therein. The supply duct section 22 and the discharge duct section 23 may be larger in cross section than the duct section within the shielding structure 1.

The exhaust gas duct 19 and the absorption or filter material duct 13 together are movable within the cavity 14 relative to the detectors 7, 8 in order to optimize the monitoring geometry, that is, to permit position adjustment to a calibration position. An arrangement having such possibility is shown in FIG. 4, which arrangement actually shows the preferred arrangement according to the invention in agreement with the schematic representation of FIG. 1. An undercarriage 24 carries the two Dewar containers 11, 12 from which coolant pipes 9, 10 extend to the detectors 2, 3 in the shielding structure 1. The shielding structure 1 is supported on a support frame 25 which is mounted on the undercarriage 24. The absorption material duct 13 extends vertically through the cavity 14 from top to bottom and is provided with valves 26, 27 below and above the shielding structure 1. The exhaust gas duct 19 (which is not visible in FIG. 4) is firmly connected to the absorption material duct 13. The filter material duct 13 is suspended from the top on carrier 28, which has rollers 29 supported on a plate 30, so that it is movable back and forth in a direction normal to the plane of the drawing.

The plate 30 itself is fixed on the shielding structure 1. The duct 13 with the carrier 28 is movable, either manually or by means of a stepping motor, so that the cavity area, that is, the absorption material volume, subjected to measuring may be changed relative to the axis 4 as desired. The carrier 28 may be locked in a desired calibration position or end position by means of knurled nuts when operated manually. Below the valve 26 there may be provided a tube for communication with a waste receiver, that is, a waste barrel. The gas exhaust duct 19 includes flexible duct sections (bellows) with which it is connected in the exhaust gas bypass duct system to the exhaust gas stack.

We claim:

1. An apparatus for detecting iodine isotopes in the exhaust gas of a nuclear installation, said apparatus being adapted to be connected in a bypass line for said exhaust gas which carries a partial exhaust gas flow and comprising a duct for said exhaust gas, an absorption chamber including absorption material disposed across said duct such that said partial exhaust gas flow is forced to pass through the absorption material in said absorption chamber, an arrangement of detectors supported at opposite sides of said absorption chamber and said exhaust gas duct in the area of said absorption chamber for measuring radioactive iodine collected in said absorption chamber, said absorption chamber being supported so as to be movable relative to said detectors for optimizing the sensing position of said detectors relative to said absorption chamber.

2. An apparatus according to claim 1, wherein said detector arrangement includes two detectors, one at each of the two opposite sides of said absorption chamber.

3. An apparatus according to claim 2, wherein said absorption chamber has a horizontal axis of symmetry along which said exhaust gas duct is disposed and vertical axis of symmetry along which said absorption material is moved through said absorption chamber, and said detectors are arranged on a common axis disposed normal to a plane defined by said axes of symmetry.

4. An arrangement according to claim 2, wherein said exhaust gas duct is joined to said absorption chamber.

5. An arrangement according to claim 4, wherein said absorption chamber is supported on a carrier which is movable horizontally in a direction normal to the detector axis, said exhaust gas duct being movable together with said absorption chamber.

6. An arrangement according to claim 2, wherein said absorption chamber and said detectors are disposed in a shielding structure having a cavity receiving said absorption chamber and being of sufficient size to permit movement of said absorption chamber relative to said detectors.

7. An arrangement according to claim 3, wherein said absorption chamber contains absorption material and means are provided for supplying absorption material to, and discharging said absorption material from, said absorption chamber only by gravity.

* * * * *